Nov. 22, 1932.   A. PULEO   1,888,834
TIRE SPREADER
Filed Aug. 29, 1931
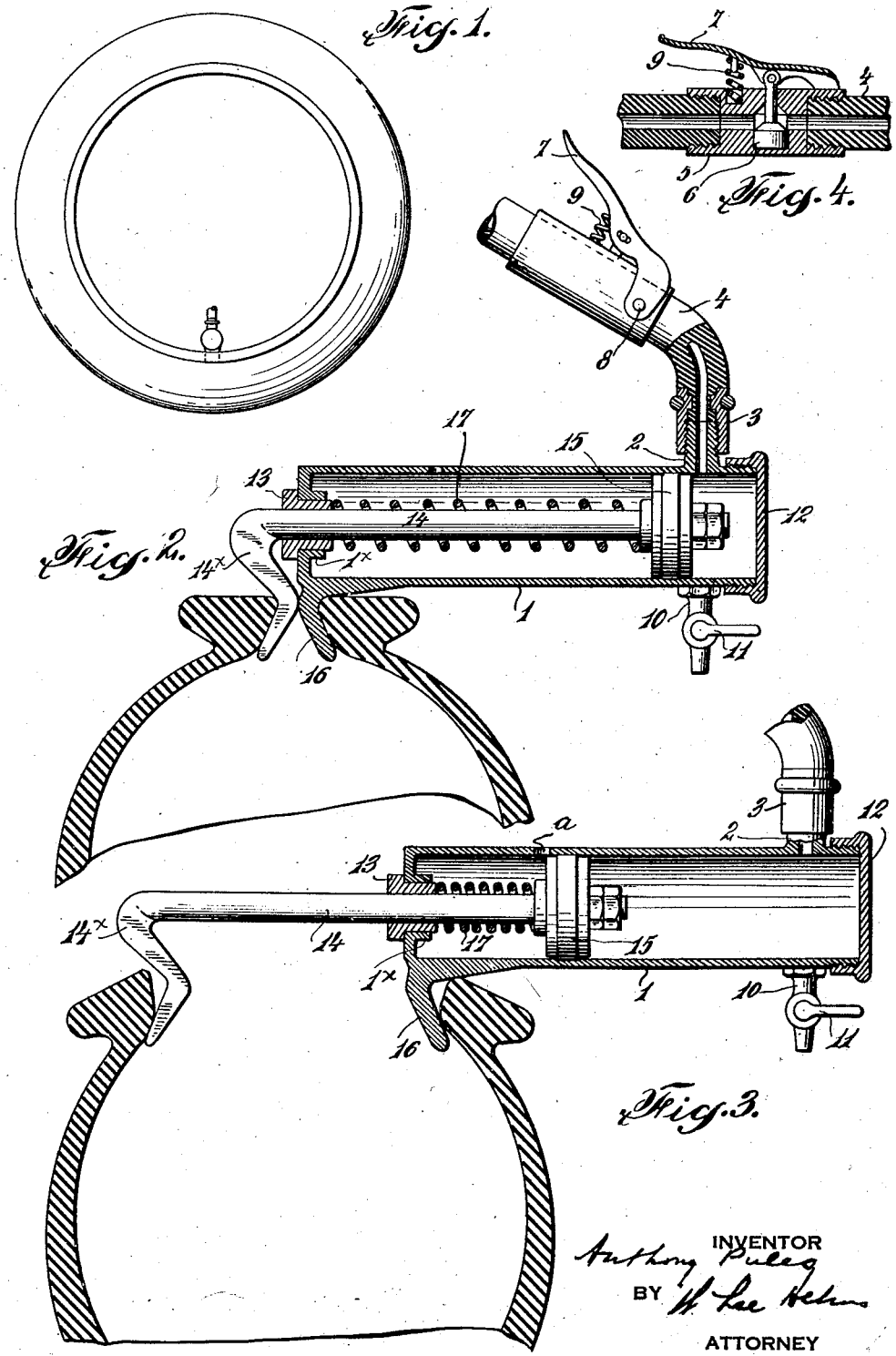
INVENTOR
Anthony Puleo
BY
ATTORNEY

UNITED STATES PATENT OFFICE

ANTHONY PULEO, OF BROOKLYN, NEW YORK

TIRE SPREADER

Application filed August 29, 1931. Serial No. 560,085.

The object of the invention is to provide a tire spreader adapted for separating beads of heavy tires such as truck tires to enable the insertion or withdrawal of inner tubes. The characteristic of the invention is that it comprises spreading elements operating pneumatically, one of the jaws of the spreader being carried as a part of a pneumatic cylinder which receives the operating member for the second jaw. A further characteristic of the invention is that means are provided for automatically shutting off pressure upon the movable jaw member when the pressure becomes excessive.

The invention will be described with reference to the accompanying drawing in which Fig. 1 is a schematic view illustrating the application of the device to a tire.

Fig. 2 is a longitudinal section through an embodiment of the invention showing the same applied to a tire, a fragment of the latter being shown in section.

Fig. 3 is a view similar to Fig. 2 showing the position of the members when the tire has been spread by operation of the spreader jaws.

Fig. 4 is a detailed view of the valve device.

Referring to the drawing it will be noted that the device comprises a cylindrical casing 1 having at one end a threaded apertured nipple 2 to receive the threaded metallic connector 3 of air hose 4. Air hose 4 may have applied thereto a valve member 5 of any suitable construction. In the present instance, the valve member comprises a headed plunger 6 pivotally connected to a lever 7 which in turn is pivoted at 8 to the valve casing and is engaged by spring 9 which serves to maintain the valve in closed position. Below nipple 2 is a discharge valve 10 of any suitable construction, having an operating handle 11. Casing 1 is closed at its rear end by a threaded cap 12 and is formed at its front end with an aperture having an inwardly extending flange 1$x$ which supports a bearing sleeve 13. Slidably supported by bearing sleeve 13 is a piston rod 14 carrying at its inner end a piston 15 and formed at its outer end with a jaw 14$x$. A second jaw 16 is carried by the casing and preferably formed integrally therewith.

Intermediate bearing sleeve 13 and piston 15 and surrounding piston rod 14, is a spiral spring 17.

In the operation of the device, the jaws 14$x$, 16, are placed between the opposed beads of the tire and handle 11 of the valve is depressed to admit air to the interior of the cylinder rearwardly of piston 15. This will cause piston 15 to move forwardly and through its action upon rod 14, will cause jaw 14$x$ to move in a direction reverse to jaw 16 and the operation may continue the parts assuming the position shown in Fig. 3.

In the position shown in Fig. 3, the beads of the tire are sufficiently spread to readily enable the insertion or removal of an inner tire. If the operator moves the piston forward excessively, it will pass a port $a$ disposed in the casing 1 and air will be forced through the port warning the operator to shut off the air. The escape of air also will prevent further forward movement of the piston and hence will serve as a safety element. When the operation, as described, has served its purpose, the valve 10 may open to cause discharge of the air and return of jaw 14$x$ to the position shown in Fig. 2, under the action of spring 17.

Having described my invention, what I claim and desire to secure by Letters Patent, is as follows:—

A tire spreader comprising a cylinder carrying thereon a tire bead engaging jaw, a piston within the cylinder, a piston rod, a tire bead engaging jaw carried by the piston rod, means for admitting air to the cylinder to cause separation of the jaws, and means for discharging air from the piston.

In testimony whereof, I have signed my name to this specification.

ANTHONY PULEO.